United States Patent Office 3,230,706
Patented Jan. 25, 1966

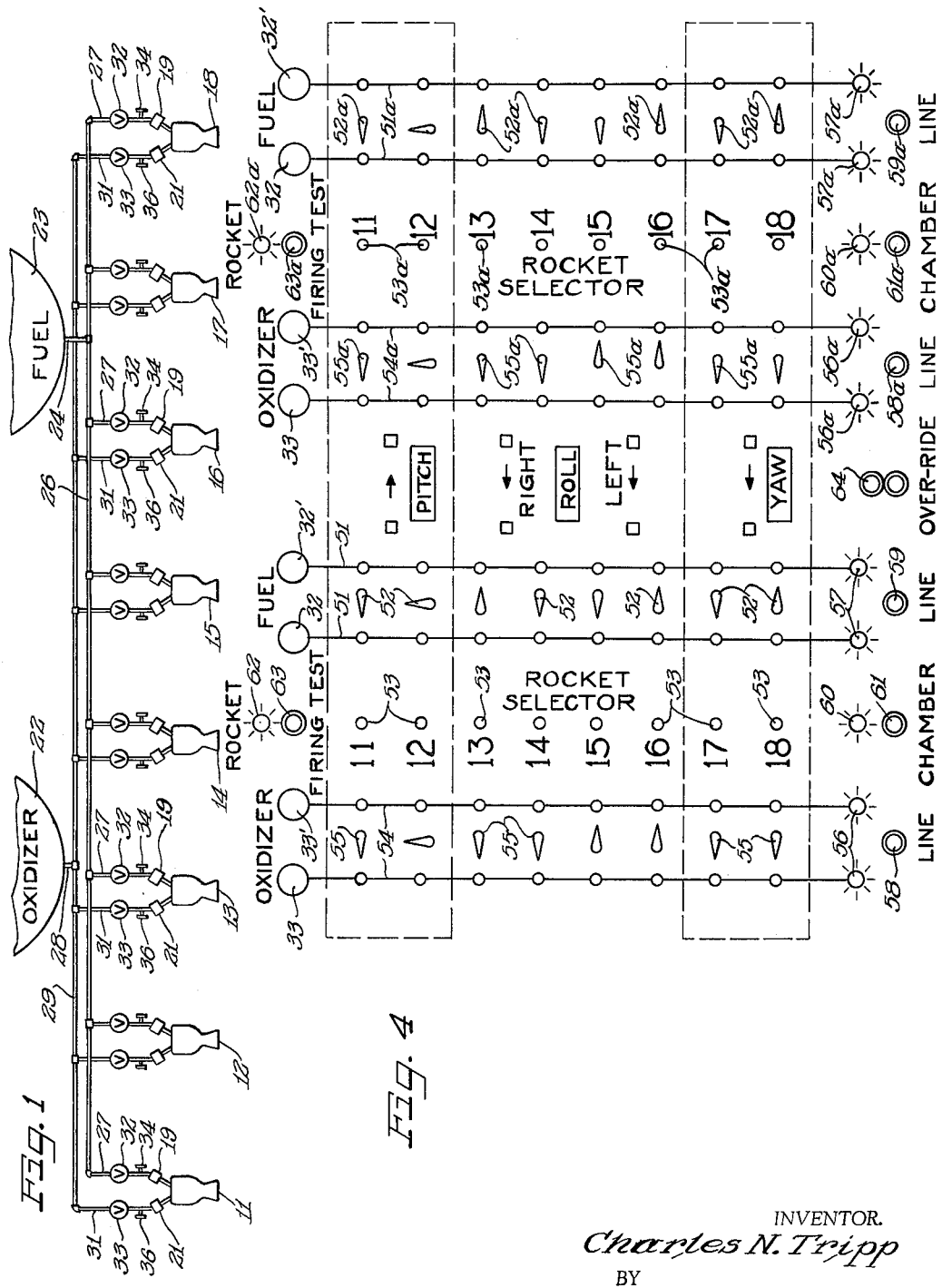

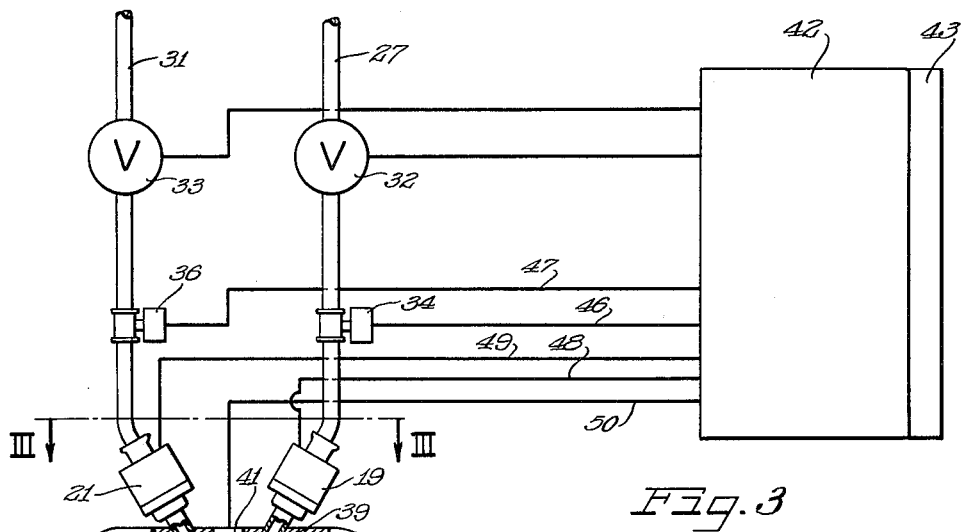
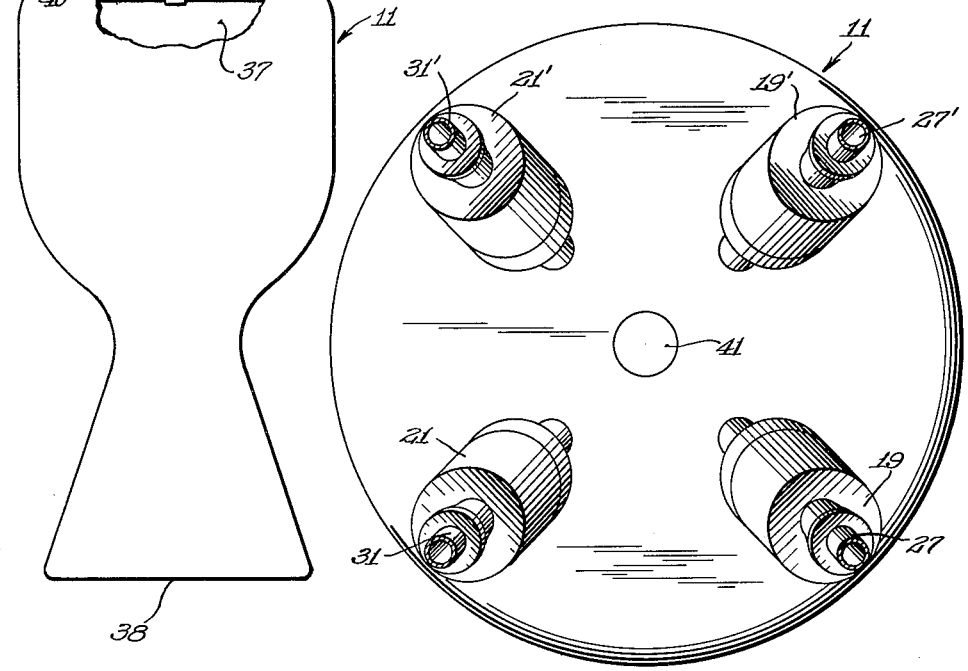

3,230,706
LEAKAGE DETECTOR
Charles N. Tripp, Los Angeles, Calif., assignor to Thompson Ramo Wooldridge Inc., Cleveland, Ohio, a corporation of Ohio
Filed Feb. 11, 1963, Ser. No. 257,487
9 Claims. (Cl. 60—35.6)

The present invention generally relates to a leakage detector and more particularly relates to a means and method of detecting leaks in the propellant system of a space borne vehicle.

A leakage in the propellant system of a space borne vehicle is very detrimental to prolonged space exploration. Even a very small leak in the propellant system would exhaust the propellant supply over a two-week period. For this reason, an effective leak detection means and method is very important. The leak detection system must be relatively light-weight, relatively non-complex, and not time consuming to be an effective system.

The present invention solves the problem of leakage in a space borne vehicle by providing a leak detection system throughout the space borne vehicle. The leak detection system advantageously utilizes a primary pair and auxiliary pair of propellant injectors with respective feed lines. Each propellant injector feed line has connected thereto an auxiliary shutoff valve and a pressure decay switch for determining whether there is a leak between the injector and the auxiliary shutoff valve. Also, each rocket motor contains a vacuum gauge type transducer to detect propellant leakage into its rocket combustion chamber and a coarse detection of leakages is furnished by the propellant tank gauge.

In the case of a large leak, all the injector line valves are closed and then selectively open. In this manner, a major offender may be detected. In order to detect small leakage, a serial monitoring system is provided. The use of a multiple read-out circuitry would merely introduce complexity and weight and would not offer compensating improvement for its detrimental complexity and weight. Serially monitoring the rocket chamber vacuum gauge transducers and then checking each of the four injector lines connected to each rocket motor to detect propellant leakage, provides the best routine. Periodic checks using a systematic closing of shutoff valves will reveal defective transducers and in some cases also leaks from other than the injectors.

Propellant leaking into the combustion chamber will, of course, evaporate and be expelled through the rocket nozzle. Initially some liquid may dribble or float out of the nozzle but it is believed that under equilibrium conditions the gas will be constrained by choking in the nozzle throat. At the maximum permissible leak of $10^{-5}$ pounds per second the pressure in the chamber, assuming gas dynamic relations apply, will be of the order of 7 to 20 microns of Hg (depending upon the particular propellant leaking). This is near the limit where gas dynamics can be used to characterize the flow and the conditions calculated may vary somewhat under actual circumstances. The transducer is inserted into the combustion chamber in a relatively quiescent zone between the injectors. The transducer will be such that a warning signal will occur when the pressure exceeds a few microns of Hg. For pressures at this level and higher, a hot wire type of vacuum gauge is suitable for pressure sensing.

The system of the present invention for determination of rocket firing and propellant flow conditions has three basic sets of indicators—a contact switch at the base of each rocket (the rockets being mounted on unidirectional flexural supports having a force setting of a few pounds); a vacuum gauge transmitter unit in each rocket combustion chamber; and a pressure decay switch on each injector feed line. The read-out indicator system in the cockpit of the space borne vehicle is designed for a minimum of complexity and is made so that there will be negligible power drain except when checking is performed.

It is therefore an object of the present invention to provide a leakage detector for space borne vehicles.

It is still another object of the present invention to provide a serial monitoring method of determining leakage in the rocket motors of a space borne vehicle.

It is another object of the present invention to provide a means and method for indicating leakage in the combustion chamber of a rocket motor.

It is further an object of the present invention to provide a rocket motor with a vacuum gauge transducer in a relatively quiescent zone in the rocket combustion chamber for determining leakage of propellant therein.

Other and further objects of this invention will be apparent to those skilled in the art from the following detailed description of the annexed sheets of drawings, which by way of a preferred example only, illustrate an embodiment of the present invention.

On the drawings:

FIGURE 1 is a partial schematic illustration of the control rockets of the present invention;

FIGURE 2 is a schematic illustration and a partial transverse cross-sectional view of a rocket motor of the present invention and the control lines therefor;

FIGURE 3 is a top view of the rocket motor illustrated in FIGURE 2 taken along lines III—III; and FIGURE 4 is a schematic illustration of a readout indicator display board utilized in the present invention.

As shown on the drawings:

Referring to FIGURE 1 there is illustrated a plurality of attitude control rockets 11, 12, 13, 14, 15, 16, 17 and 18. Rocket motors 11 and 12 are utilized on the space vehicle to control the pitch of the space vehicle; rocket motors 13, 14, 15 and 16 are placed on the space vehicle to control the roll thereof; and rocket motors 17 and 18 are placed on the space vehicle to control the yaw thereof. It is of course understood that although the present invention will be described in conjunction with the attitude rockets of the space vehicle, the invention also applies to the main thrust rocket motor of the space vehicle.

Each rocket motor has a primary fuel injector 19 and a primary oxidizer injector 21 mounted thereon. The space vehicle has an oxidizer tank 22 and a fuel tank 23 that supplies oxidizer and fuel to the control rocket motors as well as the thrust rocket motor (not shown). The control rocket motors are fed fuel by a fuel supply pipe 24 directing fuel to a fuel manifold 26 which in turn has connected thereto a plurality of branched oxidizer rocket fuel feed lines 27. The oxidizer is likewise fed to the rocket motors by an oxidizer supply pipe 28 connecting the oxidizer tank 22 to an oxidizer manifold 29 having a plurality of branched oxidizer rocket feed lines 31 extending therefrom to feed oxidizer to the rocket motors.

Each fuel feed line has a shutoff valve 32 therein and each oxidizer feed line 31 has an oxidizer shutoff valve 33. Between the shutoff valve 32 and the fuel injector 19 is a fuel pressure decay switch 34 and between the auxiliary shutoff valve 33 and the oxidizer injector 21 is an oxidizer pressure decay switch 36.

Although the diagrammatic illustration of FIGURE 1 shows only a single fuel injector 19 and single oxidizer injector 21 as well as individual feed lines therefor, it is understood that there are two fuel injectors and two oxidizer injectors with respective feed lines and controls on each rocket motor. For simplification purposes only, the auxiliary fuel injector and auxiliary oxidizer injector has not been illustrated in FIGURE 1. The auxiliary fuel injector 19' and auxiliary oxidizer injector 21' with respective feed lines 27' and 31' are illustrated in FIGURE 3.

Referring to FIGURES 2 and 3, there is illustrated a single rocket motor 11 having a combustion chamber 37 and an exhaust nozzle portion 38. The rocket motor 11 is used for illustrative purposes only and it is understood that the rocket motors 12, 13, 14, 15, 16, 17 and 18, as well as the thrust rocket motor have similar controls attached thereto and operate in a similar manner.

The rocket motor 11 has a fuel injector conduit 39 communicating the fuel injector 19 with the combustion chamber 37. The fuel injector conduit 39 is disposed at a predetermined angle to deliver the fuel to the combustion chamber in impinging relation with the oxidizer entering the combustion chamber.

The oxidizer injector 21 has an oxidizer conduit 40 communicating the oxidizer injector 21 with the combustion chamber 37. The oxidizer conduit 40 is at a predetermined angle to impinge the oxidizer at a predetermined point in the combustion chamber 37. The size of the oxidizer conduit and the size of the fuel conduit are predetermined to feed the correct proportion of hypergolic fuel and oxidizer into the combustion chamber 37 to create combustion thereof. The fuel is preferably selected from the group comprising hydrazine, unsymmetrical dimethyl hydrazine, and mixtures thereof, and the oxidizer is preferably selected from the group comprising red fuming nitric acid and nitrogen tetroxide.

The fuel and oxidizer injectors have remote control valves therein (not shown) to regulate the flow of the fuel and oxidizer to the rocket combustion chamber. The shutoff valves 32 and 33 and the pressure decay switches 34 and 36 are of the well known type. The pressure decay switches 34 and 36 will sense very small losses in fuel or oxidizer trapped between respective shutoff valves 32, 33 and injectors 19, 21. The decay switches 34 and 36 sense a pressure differential between an initial pressure condition and a subsequent pressure condition, which may be lower than the initial pressure condition due to fuel leakage through the injectors 19, 21. The pressure differential required to actuate the decay switches 34 and 36 is of predetermined value which is sufficiently small to cause the decay switches 34 and 36 to become actuated when a very small loss of fuel or oxidizer is sensed by the decay switches 34 and 36 respectively.

Inserted into the head portion of the rocket motor 11 is a vacuum gauge 41. The vacuum gauge is placed in the combustion chamber in a relatively quiescent zone between the fuel and oxidizer injectors. The gauge is set such that a warning signal will occur when the pressure in the combustion chamber exceeds a few microns of Hg i.e. 7–20 microns of Hg. In order to provide adequate strength for surviving the temperature, pressure and gas flow transients under combustion conditions the gauge is of a ruggedized design of either a platinum or a tungsten carbide sensing element that has sufficient strength to withstand combustion conditions and still yield adequate sensitivity for measurement purposes.

Two types of hot wire vacuum gauges are used in this region—the piranni and the thermouple types. Both utilize the principle of variation in heat conductivity in the region surrounding the hot wire due to presence of gas molecules. A calibrated input of electrical power is fed into the wire and the wire's change in heat balance noted either by change in wire temperature (thermocouple gauge) or by change in electrical resistance (piranni gauge).

The thermocouple gauge utilizes somewhat simpler exterior circuitry than the piranni, but has a more complex transducer. The piranni gauge is preferred in the present invention and the transducer thereof forms one leg of a Wheatstone bridge circuit. Since small electrical resistance changes must be sensed long leads between the transducer and the remaining bridge elements are avoided. Resistance temperature "transmitters" have been built where the bridge circuit is incorporated in the transducer body. For the vacuum threshold sensing function needed in the present invention, accuracy requirements are easily met with the standard quality resistors.

In order to protect against thermal radiation from the rocket walls having residual heat from firing, a radiation shield is preferably placed around the sensing element. The shield is oriented so that it "looks out of the hole" in the exhaust nozzle.

The external circuitry of the piranni gauge will consist of a transducer bridge element located in each rocket chamber. A regulated voltage is applied across the bridge causing equal current flow in corresponding arms under conditions of pressure below the threshold. This current causes heating in the transducer wire which is carried away primarily by radiation under low pressure conditions. The other bridge elements are made of "Evenohm" type wire to eliminate significant resistance variation with temperatures. Also, a heat conducting path is provided to aid in heat dissipation from the resistors.

Amplifying the output signal can be done in a number of ways i.e. applying the voltage signal to the grid of a vacuum tube biased below cutoff so that the tube will be conducting in the event an interrogating voltage is placed across it. A simple selective switch energizes the circuit and if a propellant leaks into any combustion chamber, an indicator light comes on.

The feed line shutoff valves, the fuel and oxidizer injector valves, the decay switches, and the piranni gauges are all controlled by well known means. The control means are diagrammatically illustrated in FIGURE 2, for simplification purposes, as the control box 42 having a control display panel 43 suitably connected thereto.

The shutoff valves 32 and 33 are connected to a control box 42 by suitable connecting means 44 and 45 respectively. Likewise, the pressure decay switches 34 and 36 are connected to the control box by suitable connecting means 46 and 47 respectively, the solenoid valves of the injectors 19 and 21 are connected to the control box by suitable connecting means 48 and 49 respectively, and the piranni gauge is connected to the control box by suitably connecting means 50. The control box contains all the necessary electrical equipment and switches for energizing and deenergizing the respective means by supplying and stopping the flow of current thereto and is suitably connected to the control display panel 43 for purposes hereinafter described.

It is of course understood that the auxiliary injectors 19' and 21' and the auxiliary feed lines 27' and 31' with their auxiliary shutoff valves and auxiliary decay switches are similarly suitably connected to the control box 42 and display panel 43.

FIGURE 4 illustrates the front of the control display panel 43 which is in the cockpit of the space vehicle and is utilized by the pilot thereof to detect leaks in the space vehicle. The display selector panel has a duplicate read-out indicator system for ease in testing and cutting down on the testing time of the serial monitoring leakage detection system of the present invention. Each indicator panel has numbered thereon the rocket motors to be tested such as rocket motors 11, 12, 13, 14, 15, 16, 17 and 18 with the type of attitude control they are utilized for.

The selector panel has two pair of fuel feed line indicators 51 and 51a indicating the primary fuel shutoff valve 32 and the auxiliary shutoff valve 32'.

Each pair of fuel line indicators 51 and 51a have respectively positioned therebetween a plurality of three-position fuel switches 52 and 52a. The three-position fuel switches are located so that there is one fuel switch beside each of the rocket motor selectors 53 and 53a.

Also, the selector panel has two pair of oxidizer feed line indicators 54 and 54a indicating the primary oxidizer shutoff valve 33 and auxiliary shutoff valve 33'. Each pair of oxidizer line indicators 54 and 54a have respectively positioned therebetween a plurality of three-position oxidizer switches 55 and 55a. The three-position oxidizer switches are located so that there is one oxidizer switch beside each of the rocket motor selectors 53 and 53a.

The three-position switches 52, 52a, 55 and 55a are so connected that when they point to a particular feed line, that line has its shutoff valve open and the other line has its shutoff closed; when they point upwards, both lines have their shutoff valves open; and when they point downwards, both lines have their shutoff valves closed. For example, rocket motor 11 has its three-position oxidizer feed line switch 55 pointing to oxidizer feed line 33 and rocket motor 12 has its three-position oxidizer feed line switch 55 pointing upwards. Therefore, if rocket motor 11 was activated by selector 53 with its switch 55 pointing to the left, its oxidizer feed line shutoff valve 33 would be open and its oxidizer feed line shutoff valve 33' would be closed. If rocket motor 12 was activated by selector 53 with its switch 55 pointing upwards, both its oxidizer feed line primary shutoff valve 33 and its oxidizer feed line auxiliary shutoff valve 33' would open.

The selector display panel has indicator lights 56, 57, 56a, and 57a located at the bottom of each oxidizer feed line indicator 54, each fuel line indicator 51, each oxidizer feed line indicator 54a, and each fuel line indicator 51a respectively; test line buttons 58, 59, 58a, and 59a located below and between each pair of line indicator lights 56, 57, 56a, and 57a respectively; chamber indicator lights 60 and 60a with respective chamber test buttons 61 and 61a located at the bottom of the respective plurality of rocket selectors 53 and 53a; rocket firing indicator lights 62 and 62a with respective rocket firing test buttons 63 and 63a located at the top of the respective plurality of rocket selectors 53 and 53a; and an override switch 64 located at the bottom of the selector panel between the line test buttons 59 and 61a.

The control means 42 and display panel 43 are designed for a minimum of complexity and are made so that there will be negligible power drain except when checking is performed and so that the pilot can switch in an alternate control system for one or more axes and then can manually command firing of a given rocket.

The display panel, as illustrated in FIGURE 4, has a duplicate left and right hand control system. The panel is connected so that depressing the rocket firing test button will temporarily interrupt (electrically) automatic firing commands to all axes in the respective control system, and the rocket selector has a mechanical interlock so buttons in the left hand control system cannot be activated unless automatic commands to the left hand system (by axis) cut out or automatic commands (by axis) are transferred to the right hand control system. The override button 64 cuts out the mechanical interlock but does not cut the function performed by depressing the rocket firing test button.

In operation, the pilot first selects and switches in alternatives to the axis or axes about which he is to test. Such selection will mechanically release selector buttons so that he cannot erroneously check a part of the system being used by the automatic control system. A further interlock (electrical) exists so that the propellant leak detector system and injector line shutoff valves cannot be energized while a manual firing signal is activated.

The pilot then selects a rocket for testing. A visual indication is provided as to the rocket chosen. Energizing the firing circuit should illuminate the indicator light (paired for reliability and redundancy purposes) unless the rocket is not firing. If this latter condition is indicated, the pilot can switch on the alternate injector for either oxidizer or fuel to determine if an injector valve has failed in the closed position (and/or a shut-off valve). The particular injector circuit chosen (or neutral) is indicated visually by the three-position switches for each rocket.

To test for propellant leaks (still at the particular rocket selected) the master test button 61 (labeled "Chamber") is pushed which will show, by the indicator 60 lighting, that an over-threshold pressure exists in the event that a propellant leak into the combustion chamber exists. (This is using the vacuum transducers in the chamber.) Should such be indicated, selectively switching propellant lines will then isolate the particular injector valve (or valves) leaking.

A redundant test system exists in the pressure decay switch system. Here the injector line three-position switch is placed in the middle (up) (or neutral) position which means that both injector line shutoff valves are opened while the corresponding fuel and oxidizer injectors are closed. Thus, a predetermined static pressure exists in the fuel and oxidizer feed lines between respective valves 32, 33 and injectors 19, 21. Activating the test line button on the decay pressure switch circuit will close both valves to isolate the pressure between the shutoff valves 32, 33 and the injectors 19, 21, and the pilot holds the button down for a few seconds. The pressure decay switches 34 and 36 will sense very small loss of fuel or oxidizer trapped between respective shutoff valves 32, 33 and injectors 19, 21 as mentioned hereinabove. If neither indicator light comes on after a few seconds both circuits will be shown to be okay. A light in either (or both) will indicate a leak of fuel or oxidizer through the injector 19 and 20 respectively. The intensity of the leak is denoted by the shortness of the time interval between the instant the test switch is depressed and the instant the indicating lamp become lit. If both indicating lamps become lit, but at different instances, the operator can choose the system having the largest time constant, which indicates the smallest leak.

It will be noted that the duplicate control panel is designed to provide the minimum amount of time to test rocket motor leakage. The left and right display panel are set so that their three position indicator switches are utilizing different combinations of fuel and oxidizer lines. By utilizing different combinations, the three-position switches in one of each panel is merely turned to an opposite feed line in order to test the four possible com-combinations of feed lines and injectors capable of use for the particular rocket motor i.e. for rocket motor 11 the left-hand side of the control panel illustrates primary shutoff valve 32 open and primary oxidizer shutoff valve 33 open the right-hand side of the panel illustrates secondary oxidizer shutoff valve 33' open and primary fuel shutoff valve 32 open. This teaches the testing of two of the possible four combinations of fuel and oxidizer feed lines. The turning of the switches 52 and 52a to their opposite directions would cause in the left-hand panel oxidizer shutoff valve 33 to be open and fuel auxiliary shutoff valve 32' to be open and on the right-hand side of the panel would cause oxidizer auxiliary shutoff valve 33 to be open and auxiliary fuel shutoff valve 32' to be open.

It is of course understood, that the above leak detection method may be performed while the space vehicle is on its launching pad as well as when it is space borne. Therefore, as is evidenced by the above description, I have provided an effective system for detecting leaks in the rocket motors of space vehicles.

Although various minor modifications might be apparent to those skilled in the art, it is to be understood that I wish to embody within the scope of the patent warranted hereon all such embodiments as reasonably and properly come within the scope of my contribution to the art.

I claim as my invention:

1. A leak detection system for a rocket motor having a combustion chamber comprising:
 a propellant supply tank,
 a propellant feed line connecting the supply tank to the rocket motor to supply propellant to the rocket motor combustion chamber,
 a vacuum transducer gauge mounted within said rocket motor combustion chamber to detect any leakage of propellant into the combustion chamber, and
 a decay switch mounted on said feed line to detect any leakage of propellant therein.

2. A leak detection system for a rocket motor having a combustion chamber comprising:
 a propellant supply tank,
 a propellant feed line connecting the supply tank to the rocket motor to supply propellant to the rocket motor combustion chamber,
 a vacuum transducer gauge mounted within said rocket motor combustion chamber to detect any leakage of propellant into the combustion chamber,
 a shutoff valve located in said feed line to stop the flow of propellant therethrough, and
 a pressure responsive switch mounted on said feed line between said rocket motor and said shutoff valve to detect any leakage of propellant therein.

3. A leak detection system for a rocket motor having a combustion chamber comprising:
 a propellant supply tank,
 a propellant injector mounted on the rocket motor to inject propellant into the combustion chamber in response to a remote signal,
 a propellant feed line connecting the supply tank to the propellant injector,
 a vacuum transducer gauge having its sensing means mounted within said rocket motor combustion chamber to detect any leakage of propellant into the combustion chamber, and
 a decay switch mounted on said feed line to detect any leakage of propellant therein.

4. A leak detection system for a plurality of rocket motors on a space vehicle comprising:
 a propellant supply tank,
 each rocket motor having a combustion chamber,
 primary and auxiliary propellant injectors mounted on each rocket motor to inject propellant into the rocket motor combustion chamber,
 separate propellant feed lines connecting the propellant tank with the primary and auxiliary propellant injectors,
 each propellant feed line having a remote controlled shutoff valve thereon,
 each propellant feed line having a remote controlled pressure decay switch mounted thereon between the respective line shutoff valve and injector to detect pressure decay in the respective feed line,
 a piranni gauge having a sensing means mounted within the combustion chamber of each rocket motor,
 said piranni gauge being mounted between the fuel and oxidizer injectors in a relatively quiescent zone in the combustion chamber, and
 means to selectively activate the shutoff valves, decay switches, injectors, and piranni gauges
whereby leakage occurring in any of the feed lines and injectors is detected by serially monitoring the rocket motors and their respective feed lines and injectors.

5. A leak detection system for a plurality of rocket motors on a space vehicle comprising:
 a fuel supply tank,
 an oxidizer supply tank,
 each rocket motor having a combustion chamber,
 a fuel and an oxidizer injector mounted on each rocket motor to inject fuel in impinging relationship into the rocket motor combustion chamber,
 a fuel feed line connecting the fuel tank with the fuel injector,
 an oxidizer feed line connecting the oxidizer tank with the oxidizer injector,
 each fuel and oxidizer feed line having a remote controlled shutoff valve thereon,
 each fuel and oxidizer feed line having a remote controlled pressure decay switch mounted thereon between the respective feed line shutoff valves and injectors to detect pressure decay in the respective lines,
 a piranni gauge mounted within the combustion chamber of each rocket motor,
 said piranni gauge being mounted between the fuel and oxidizer injectors in a relatively quiescent zone in the combustion chamber, and
 means to selectively activate the shutoff valves, decay switches, fuel and oxidizer injectors, and piranni gauges
whereby leakage occurring in the fuel and oxidizer feed lines and injectors is detected by serially monitoring the rocket motors and their respective fuel and oxidizer feed lines and injectors.

6. A leak detection system for a plurality of rocket motors on a space vehicle comprising:
 a fuel supply tank,
 an oxidizer supply tank,
 each rocket motor having a combustion chamber,
 a fuel injector mounted on each rocket motor to inject fuel into the rocket motor combustion chamber,
 an oxidizer injector mounted on each rocket motor to inject oxidizer into the rocket motor combustion chamber in impinging relation with said fuel,
 a fuel feed line connecting the fuel tank with the fuel injector,
 an oxidizer feed line connecting the oxidizer tank with the oxidizer injector,
 a piranni gauge having a sensing means attached to each rocket motor,
 said piranni gauge sensing means being mounted between the fuel and oxidizer injectors in a relatively quiescent zone within the combustion chamber, and
 said sensing element being ruggedized and made from materials selected from the group comprising platinum and tungsten carbide,
whereby leakage occurring in any of the fuel and oxidizer injectors is detected by serially monitoring the rocket motors and their respective fuel and oxidizer injectors.

7. A leak detection system for a plurality of rocket motors on a space vehicle comprising:
 a fuel supply tank,
 an oxidizer supply tank,
 each rocket motor having a combustion chamber,
 a primary and an auxiliary fuel injector mounted on each rocket motor to inject fuel into the rocket motor combustion chamber,
 a primary and an auxiliary oxidizer injector mounted on each rocket motor to inject oxidizer into the rocket motor combustion chamber,
 a primary and an auxiliary fuel feed line connecting the fuel tank with the primary and auxiliary fuel injectors respectively,
 a primary and an auxiliary oxidizer feed line connecting the oxidizer tank with the primary and auxiliary oxidizer injectors respectively,
 a transducer vacuum gauge mounted on each rocket motor, said gauge having a sensing element mounted between the fuel and oxidizer injectors within the combustion chamber,
 said sensing element being made from materials selected from the group comprising platinum and tungsten carbide, and
whereby leakage occurring in any of the fuel and oxidizer injectors is detected by serially monitoring the rocket motors and their respective fuel and oxidizer injectors.

8. A leak detection system for a plurality of rocket motors on a space vehicle comprising:
a fuel supply tank,
an oxidizer supply tank,
each rocket motor having a combustion chamber,
a primary and an auxiliary fuel injector mounted on each rocket motor to inject fuel into the rocket motor combustion chamber,
a primary and an auxiliary oxidizer injector mounted on each rocket motor to inject oxidizer into the rocket motor combustion chamber,
a primary and an auxiliary fuel feed line connecting the fuel tank with the primary and auxiliary fuel injectors respectively,
a primary and an auxiliary oxidizer feed line connecting the oxidizer tank with the primary and auxiliary oxidizer injectors respectively,
each primary and auxiliary fuel feed line and each primary and auxiliary oxidizer feed line having a remote controlled shutoff valve thereon,
each primary and auxiliary fuel feed line and each primary and auxiliary oxidizer feed line having a remote controlled pressure decay switch mounted thereon between the respective line shutoff valve and injector to detect pressure decay in the respective feed line,
a piranni gauge mounted on each rocket motor, said piranni gauge having a pressure sensing element mounted between the fuel and oxidizer injectors within the combustion chamber,
said sensing element being made from materials selected from the group comprising platinum and tungsten carbide, and
means to selectively activate the shutoff valves, decay switches, fuel and oxidizer injectors, and piranni gauges
whereby leakage occurring in any of the fuel lines and injectors is detected by serially monitoring the rocket motors and their respective fuel and oxidizer feed lines and injectors.

9. A method of detecting propellant leaks in a plurality of rocket motors of a space vehicle wherein each rocket motor has primary and auxiliary fuel and oxidizer injectors, a vacuum gauge in its combustion chamber, and primary and auxiliary fuel and oxidizer feed lines for feeding fuel to the respective injectors, and each feed line having a shutoff valve and a decay switch therein comprising:
selecting a first rocket motor to be tested and thereafter serially testing the other rocket motors for leakage,
testing said first rocket motor and the other rocket motors thereafter by
selecting a fuel and oxidizer injector to be used for directing fuel and oxidizer into said first rocket motor combustion chamber, firing said rocket motor to determine whether said rocket motor is operating,
selecting the other fuel and oxidizer injector and firing said first rocket motor using the other fuel and oxidizer injectors to determine whether they are operating properly,
ceasing the firing of said first rocket motor, testing the pressure in the combustion chamber to determine whether the pressure therein is over a predetermined over-threshold pressure that indicates leakage therein,
opening all the feed line shutoff valves of the first rocket motor,
closing all the fuel and oxidizer injectors of the first rocket motor,
closing all the feed line shutoff valves of the first rocket motor, and
determining any pressure loss in the feed lines of the first rocket motor by the decay switch and the relative rapidity of the pressure loss between the feed lines
whereby leakage of propellant into the first selected rocket motor is detected.

References Cited by the Examiner
UNITED STATES PATENTS

| | | | |
|---|---|---|---|
| 2,600,891 | 6/1952 | MacNeille. | |
| 2,902,824 | 9/1959 | Sponzilli | 60—39.09 |
| 3,070,676 | 12/1962 | Moseres | 340—239 X |
| 3,086,583 | 4/1963 | Reichow | 158—123 |

MARK NEWMAN, *Primary Examiner.*

SAMUEL LEVINE, *Examiner.*